United States Patent
Cicman et al.

(10) Patent No.: US 8,131,776 B2
(45) Date of Patent: Mar. 6, 2012

(54) AUTOMATED MIGRATION OF TRANSLATION MAPS FOR USE IN EXCHANGING DOCUMENTS BETWEEN ENTITIES

(75) Inventors: Joseph Stephan Cicman, Columbus, OH (US); Piyush Deshpande, Chhindwara (IN); Anshu Kapoor, Agra (IN); Karthikeyan Kasthuriswamy, K.R. Puram (IN)

(73) Assignee: International Business Machines Corporation, International Group, B.V., Amsterdam (NL)

( * ) Notice: Subject to any disclaimer, the term of this patent is extended or adjusted under 35 U.S.C. 154(b) by 246 days.

(21) Appl. No.: 12/651,184

(22) Filed: Dec. 31, 2009

(65) Prior Publication Data

US 2010/0281072 A1 Nov. 4, 2010

Related U.S. Application Data

(60) Provisional application No. 61/174,877, filed on May 1, 2009.

(51) Int. Cl.
*G06F 12/00* (2006.01)
(52) U.S. Cl. .................................. 707/803; 707/809
(58) Field of Classification Search .................. 707/802, 707/803, 804, 809, 999.101, 999.103, 999, 707/104, 513, 523
See application file for complete search history.

(56) References Cited

U.S. PATENT DOCUMENTS

| | | | |
|---|---|---|---|
| 6,064,666 A | 5/2000 | Willner et al. | |
| 6,289,382 B1 | 9/2001 | Bowman-Amuah | |
| 6,332,163 B1 | 12/2001 | Bowman-Amuah | |
| 6,339,832 B1 | 1/2002 | Bowman-Amuah | |
| 6,434,568 B1 * | 8/2002 | Bowman-Amuah | ............. 1/1 |
| 6,434,628 B1 | 8/2002 | Bowman-Amuah | |
| 6,438,594 B1 | 8/2002 | Bowman-Amuah | |
| 6,442,748 B1 | 8/2002 | Bowman-Amuah | |
| 6,477,580 B1 | 11/2002 | Bowman-Amuah | |
| 6,477,665 B1 | 11/2002 | Bowman-Amuah | |
| 6,529,909 B1 | 3/2003 | Bowman-Amuah | |
| 6,529,948 B1 | 3/2003 | Bowman-Amuah | |
| 6,539,396 B1 | 3/2003 | Bowman-Amuah | |
| 6,549,949 B1 | 4/2003 | Bowman-Amuah | |
| 6,550,057 B1 | 4/2003 | Bowman-Amuah | |
| 6,571,282 B1 | 5/2003 | Bowman-Amuah | |
| 6,601,192 B1 | 7/2003 | Bowman-Amuah | |
| 6,606,660 B1 | 8/2003 | Bowman-Amuah | |
| 6,615,199 B1 | 9/2003 | Bowman-Amuah | |
| 6,615,253 B1 | 9/2003 | Bowman-Amuah | |
| 6,636,242 B2 | 10/2003 | Bowman-Amuah | |
| 6,640,238 B1 | 10/2003 | Bowman-Amuah | |
| 6,640,244 B1 | 10/2003 | Bowman-Amuah | |
| 6,640,249 B1 | 10/2003 | Bowman-Amuah | |
| 6,715,145 B1 | 3/2004 | Bowman-Amuah | |

(Continued)

*Primary Examiner* — Hung T Vy
(74) *Attorney, Agent, or Firm* — Jackson Walker L.L.P.; Joseph P. Lally (57) ABSTRACT

A method for migrating a legacy translation map to an evolved translation map includes determining an input file structure from input file structure information in the legacy translation map, determining an output file structure from output file structure information in the legacy translation map, and creating an XML binding object representation of source code for the input and output file structure. The method may further include creating an evolved language object representation of translation instructions in the legacy translation map, adding temporary segments to the XML binding object representation for the input file structure, and generating evolved language object representation of instructions to write input data into the temporary segments. The evolved language object representation of translation instructions is then merged into the XML binding object representation. The evolved translation map is then generated as an XML file based on the XML binding object representation resulting from the merging.

20 Claims, 5 Drawing Sheets

U.S. PATENT DOCUMENTS

| | | |
|---|---|---|
| 6,742,015 B1 | 5/2004 | Bowman-Amuah |
| 6,842,906 B1 | 1/2005 | Bowman-Amuah |
| 7,289,964 B1 | 10/2007 | Bowman-Amuah |
| 2002/0099735 A1* | 7/2002 | Schroeder et al. ............ 707/513 |
| 2003/0058277 A1 | 3/2003 | Bowman-Amuah |
| 2005/0091639 A1* | 4/2005 | Patel ............................. 717/114 |

\* cited by examiner

AUTOMATED MIGRATION OF TRANSLATION MAPS FOR USE IN EXCHANGING DOCUMENTS BETWEEN ENTITIES

RELATED APPLICATION

This application claims priority to U.S. Patent Application Ser. No. 61/174,877 filed May 1, 2009, the content of which is hereby incorporated in its entirety by reference.

BACKGROUND

1. Field of the Disclosure

The present disclosure relates to the field of business-to-business commerce and, more particularly, to the automated exchange of business documents between trading partner entities.

2. Description of the Related Art

Enterprises that engage in business-to-business (B2B) transactions employ systems to generate, exchange, and interpret electronic business documents such as electronic purchase orders, invoices, and other documents. Entities that exchange electronic business are referred to herein as trading partners. Trading partners may employ different enterprise applications and/or database applications internally. Even trading partners that use the same application platforms internally may use different formats for the same types of electronic documents. To enable automated B2B transactions, each trading partner typically develops at least one translation map to translate an outgoing document from the applicable internal format to an external format, which is agreed upon by the trading partners, and at least one translation map to translate an incoming document from the external format to the applicable internal format. Large enterprises having numerous trading partners often have a significant investment in the development of translation maps for their trading community.

DESCRIPTION OF THE EMBODIMENT(S)

An enterprise may have a substantial investment of resources in the translation maps the enterprise has developed for use in enabling B2B transactions with its trading partners. If the entity updates or changes an internal application or platform, e.g., an integration application, that invokes translation maps, the effort needed to migrate the entity's existing translations maps to the new application or platform may be considerable.

In one aspect, a disclosed method for migrating a legacy translation map suitable for a legacy application or platform to an evolved translation map suitable for an evolved application or platform includes determining an input file structure from input file structure information in the legacy translation map, determining an output file structure from output file structure information in the legacy translation map, and creating an extensible markup language (XML) binding object representation, e.g., an XMLBeans object representation, of source code for the input and output file structure. The method may further include creating an evolved language object representation, e.g., a Java® object representation, of translation instructions in the legacy translation map, adding temporary segments to the XML binding object representation for the input file structure, and generating evolved language object representation of instructions to write input data into the temporary segments. The evolved language object representation of translation instructions may then be merged into the XML binding object representation. The evolved translation map is then generated as an XML file based on the XML binding object representation resulting from the merging.

The evolved language object representation may include a Java® object representation and the XML binding object representation may include an XMLBeans object representation. Prior to adding the temporary segments, some embodiments may include removing from the Java® object representation of translation instructions, instructions that are not relevant to the evolved platform. Moreover, prior to adding the temporary segments, some embodiments may sort the Java® object representation of the instructions for proper execution sequence in the evolved platform. Creating the evolved language object representation of translation instructions may include reading translation instructions in the legacy translation map using a suitable language engine. At least one of either the input file structure and/or the output file structure may comply with an electronic data interchange (EDI) standard. The method may include invoking the evolved translation map to convert the input file into an EDI compliant electronic document.

Disclosed herein is a translation map migration application (TMMA) for automating much of the effort required to migrate a translation map from a legacy platform to a new platform (the new platform is also referred to herein as the evolved platform). In the figures and the accompanying description, the TMMA is described in the context of an implementation in which the legacy integration application is exemplified by the Gentran Server Unix (GSU) product from Sterling Commerce, Inc. and the evolved application is exemplified by the Gentran Integration Suite (GIS) product, also from Sterling Commerce, Inc.

The TMMA automates steps in the conversion of GSU translation maps to GIS translation maps. Translation maps are invoked to translate an input file to an output file where one of the files is an EDI compliant file having a format or syntax agreed upon by the trading parties and the other file has a format or syntax that complies with internal formats of one of the trading partners. For the situation in which an electronic document is incoming to a trading partner from the network the input file is the EDI compliant file. Conversely, the output file is the EDI compliant file when a trading partner generates an electronic document and transmits it across the network. The GSU translation maps and the GIS translation maps each include descriptions of the format/syntax of the input file, descriptions of the format/syntax of the output file, and run-time translation instructions for creating an output file from an input file. The TMMA converts the input file description and output file description of the GSU maps to file descriptions that are compatible with GIS. Similarly, the TMMA converts the GSU compatible translation instructions to GIS translation instructions.

In some embodiments, the TMMA is implemented as a software tool, accessible within an evolved integration platform. The tool may include a grammar parser that reads source code for the legacy map and converts it to Java® objects. The tool may further include an XML-Java® object model which represents the translation map in the evolved platform. An instruction interpreter of the tool may map instructions in the legacy map to instructions compatible in the evolved environment. The tool may further include a reporting module that informs a user of any instructions that the tool could not convert automatically.

In some embodiments, the TMMA may convert the input and output file structures by first setting elements and segments as either active or not active and then converting standard links. The TMMA may generate a report indicating links between elements that are not at the same hierarchical level. Standard rules are then converted from the legacy platform to the evolved platform. A report of any references to features that are not supported by the evolved platform may be generated. System Variables, Constants, and Code (synonym table) are then invoked.

For input and output segments not at the same hierarchical level, temporary input records or temporary segments and associated extended rules to populate them may be used to complete a translation. The extended rules may then be converted. EDI element names may be converted according to a data dictionary name used in evolved platform standards. Paired-Multiple conditions may then be updated using information from the Sterling Integrator standards.

In some embodiments, significant components of the tool include a Structure Reader for reading the structure of a legacy map, e.g., a GSU compliant .VMP file, an Instruction Sorter and Analyzer, a Language Parsing Component, an MXL Syntax Generation Component, Source Side temporary creator and accessor builder component for MXL rules, a Logging Mechanism, and a Report Generator.

In some embodiments, the TMMA disclosed herein is an application or tool, implemented in software, hardware, or a combination thereof, for automatically migrating a translation map compatible with a legacy application or platform to a translation map compatible with a more recently released application or platform. For reference, the format usable with the legacy application will be referred to herein as the legacy format, and the format usable with the evolved application will be referred to herein as the evolved format. Similarly a translation map compatible with the legacy format is referred to herein as a legacy map file (LMF) and a translation map compatible with the evolved format is referred to herein as an evolved map file (EMF). In some implementations, the LMF may have a "VMP" file extension, which will be familiar to users of the GenTran Server Unix product from Sterling Commerce, Inc., and the EMF may have an "MXL" file extension. The TMMA may permit a user to create an EMF from an LMF with minimal user intervention, and without having to generate the EMF from scratch.

In some embodiments, the LMF is a text file and the EMF may use a textual markup scheme such as XML to define data fields. This permits the use of simplified object architectures, such as XMLBeans, with a high-level language, such as Java® (a registered trademark of Sun Microsystems, Inc.). The object architecture permits fields in the map to be encapsulated as software objects and easily manipulated within the high-level language.

In some embodiments, the TMMA may employ a language engine such as ANTLR (ANother Tool for Language Recognition) to process text in the LMF. ANTLR is a widely-distributed language tool that provides a framework for creating translators that operate on grammatical descriptions.

In general, embodiments of the TMMA may include any one or more of the following components:
LMF Structure Reader
LMF Instruction Sorter and Analyzer
Language Parser
EMF Syntax Generator
Source Side temporary creator and accessor builder component for EMF rules
Logging Mechanism
Report Generator The TMMA may be built upon a suitable application framework including, for example, the Spring Framework. The Spring Framework is an open source application framework for the Java® platform. The core features of the Spring Framework can be used by any Java® application, but there are extensions for building web applications on top of the Java® Enterprise platform. The Spring Framework has become popular in the Java® community as an alternative to, replacement for, or even addition to the Enterprise JavaBean (EJB) model. Features of the Spring Framework that may be suitable for a TMMA include dependency injection, a bean factory, aspect oriented programming (AOP), and method interception to allow inserting custom behavior before or after method invocations for logging and reporting, design patterns to automatically take care of inbound and outbound maps, and event based modeling for a VMP File reader.

In the following description, details are set forth by way of example to facilitate discussion of the disclosed subject matter. It should be apparent to a person of ordinary skill in the field, however, that the disclosed embodiments are exemplary and not exhaustive of all possible embodiments. Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Figure 1:
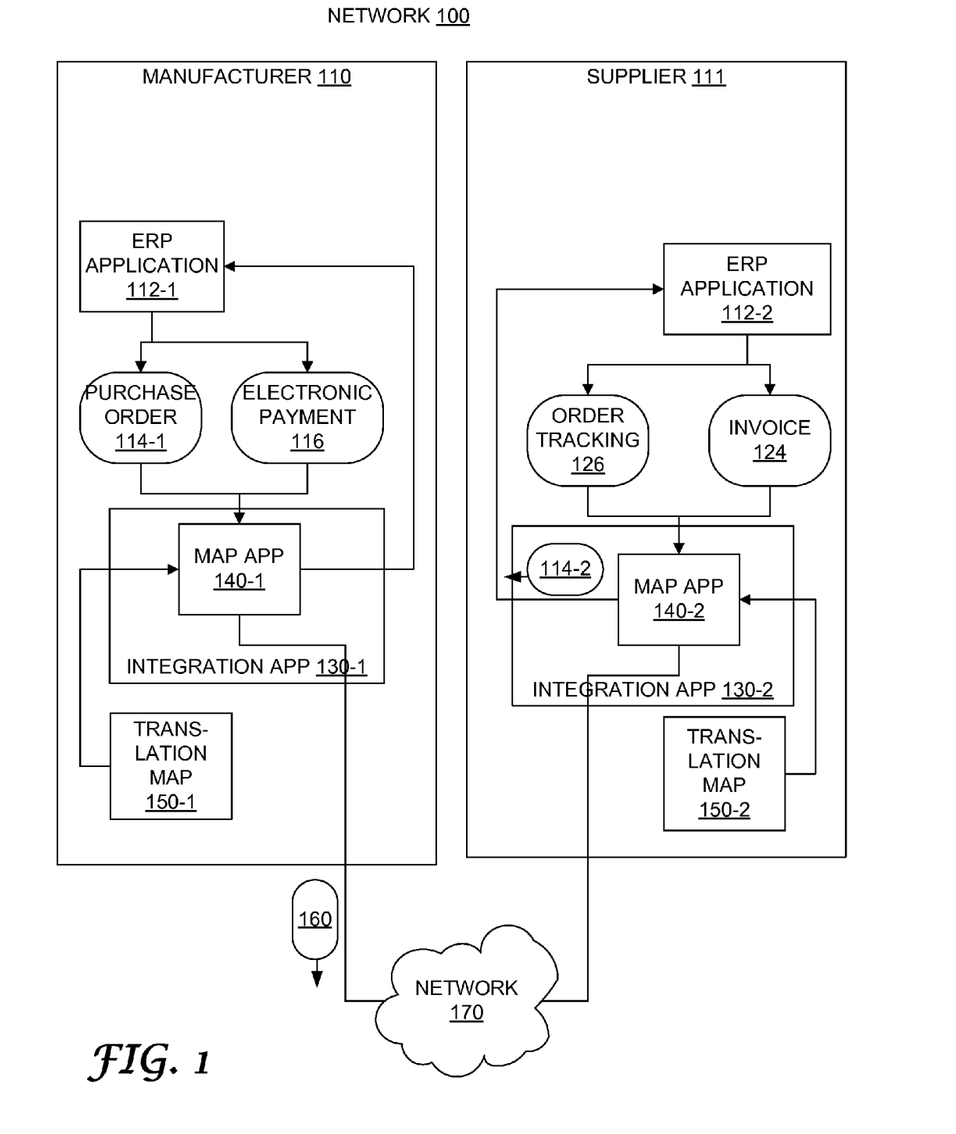
FIG. 1 is a block diagram depicting selected elements of a data network emphasizing a B2B transaction between two trading partners.

Referring now to the drawings, FIG. 1 discloses selected elements of an embodiment of a B2B data network 100 emphasizing elements that illustrate an exemplary B2B transaction between trading partners identified as manufacturer 110 and supplier 111. In the depicted embodiment, manufacturer 110 uses a first enterprise resource planning (ERP) platform including a first ERP application 112-1.

First ERP application 112-1 is depicted generating a business document in the form of a purchase order 114-1. Manufacturer 110 as depicted employs a first integration application 130-1 that coordinates potentially disparate internal applications. For example, in addition to first ERP application 112-1, manufacturer 110 may employ a database management system (DBMS) (not depicted) that may not be directly compatible with first ERP application 112-1. In these instances, first integration application 130-1 may coordinate communication between these two internal systems.

In the depicted embodiment, first integration application 130-1 includes a first mapping application 140-1 having access to a first translation map 150-1. First mapping application 140-1 is configured to "map" the information contained in purchase order 114-1 into a format agreed upon by both trading partners, using first translation map 150-1 as a guide, to produce electronic document 160. In this example, electronic document 160 includes information from purchase order 114-1 formatted in compliance with a format agreed upon by manufacturer 110 and a second enterprise, namely, supplier 111. The agreed-upon format generally includes an agreement upon a standard to which the outbound document must comply, e.g., an EDI standard such as X12 or EDIFACT, as well as the structure of the specific document including the document elements and conventions.

From the perspective of manufacturer 110, electronic document 160 is an "outbound" document or output file and is sometimes referred to as such. Generally, mapping applications, including first mapping application 140-1 and second mapping application 140-2, include outbound translation maps for translating documents that are being sent from the enterprise to a trading partner and inbound translation maps for translating documents sent by a trading partner to the enterprise.

As depicted in FIG. 1, first integration application 130-1 sends electronic document 160 over a network 170 to supplier 111. Supplier 111 as shown employs an ERP platform that includes a second ERP application 112-2 and a second integration application 130-2 which includes a second map application 140-2. From the perspective of supplier 111, document 160 is an inbound document or input file. Second mapping application 140-2 may be invoked to access the applicable translation map, depicted as second translation map 150-2. Second mapping application 140-2 uses second translation map 150-2 to generate a purchase order 114-2 that has a format compatible with second ERP application 112-2. In this example, purchase order 114-2 is an output file generated by mapping application 140-2.

Supplier 111 may then generate an invoice 124 and order tracking information 126, which may be processed by second mapping application 140-2 and the resulting documents (not depicted) may then be delivered over network 170. Upon receiving the invoice, manufacturer 110 may then generate and transmit an electronic payment 116 to complete the transaction. In the depicted example, both enterprises use mapping applications 140. In other cases, only one of the two enterprises may have a mapping application 140.

Figure 2:
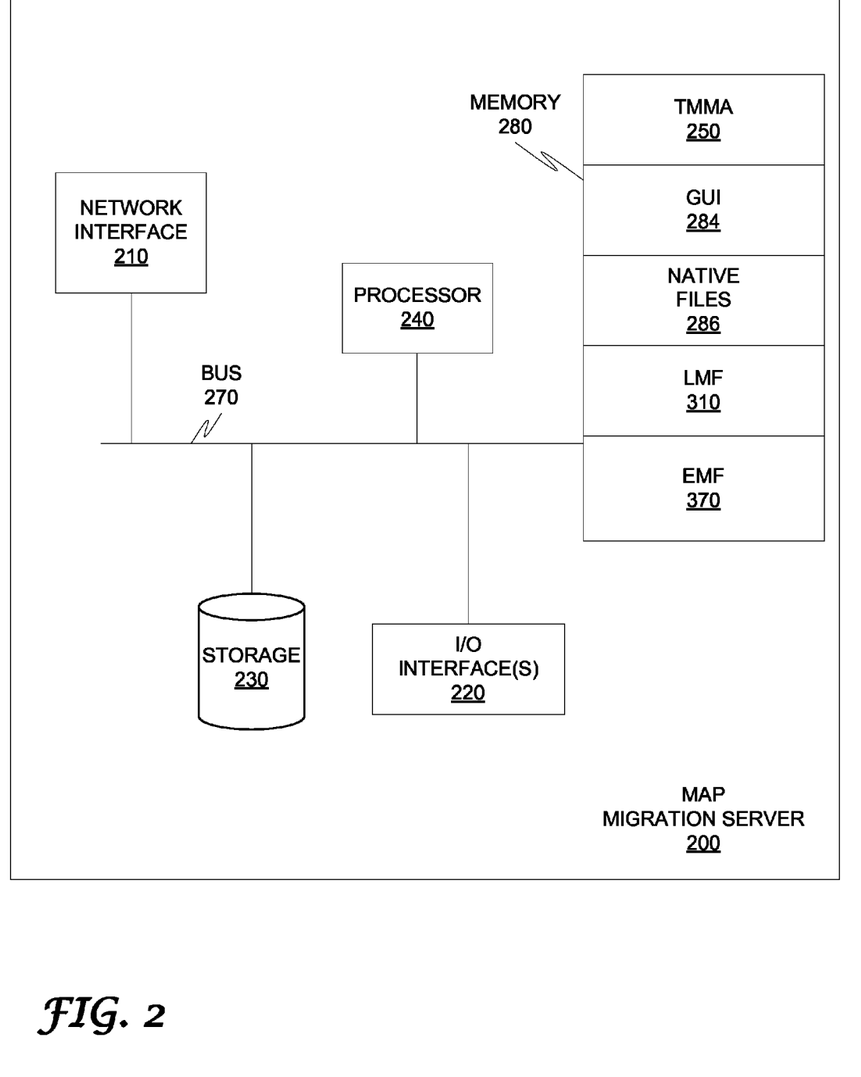
FIG. 2 is a block diagram of selected elements of an embodiment of a map migration server.

FIG. 2 depicts selected elements of an embodiment of a map migration server 200, which may be implemented on any suitable computing device, including a general-purpose or special-purpose computing device. A processor 240, which may be any suitable type of processor known in the art including, e.g., general purpose microprocessors, embedded processors, controllers, etc., may be connected to storage 230 via a system bus 270. Storage 230 may include optical, solid-state, or other tangible and persistent storage media that is accessible, either locally or remotely, to processor 240. Storage 230 is configured to store computer data and computer executable instructions.

Map migration server 200 as shown further includes input/output (I/O) interface(s) 220, which may include a video controller and/or graphics adapter useful for displaying output to an end user. A network interface 210 connected to bus 270 provides communication with a network (not depicted). In addition, FIG. 2 depicts a memory 280 accessible to processor 240 via system bus 270. A memory controller (not depicted) enabling processor 240 to access data and instructions stored in memory 280 may be integrated within processor 240 or implemented as a discrete component.

Memory 280 may contain volatile and/or non-volatile memory components accessible to processor 240. Like storage 230, memory 280 may store data and sets of instructions, modules, or programs to implement certain features. In the depicted embodiment, memory 280 includes TMMA 250 for providing automated map migration services including services for creating translation maps suitable for use with an evolved format. A graphical user interface (GUI) 284 may be included to provide intuitive interaction with an end user. Native files 286 may be used to store and retrieve relevant data. In some implementations, LMF 310 represents input into TMMA 250 wile EMF 370 represents output generated by TMMA 250.

Figure 3:
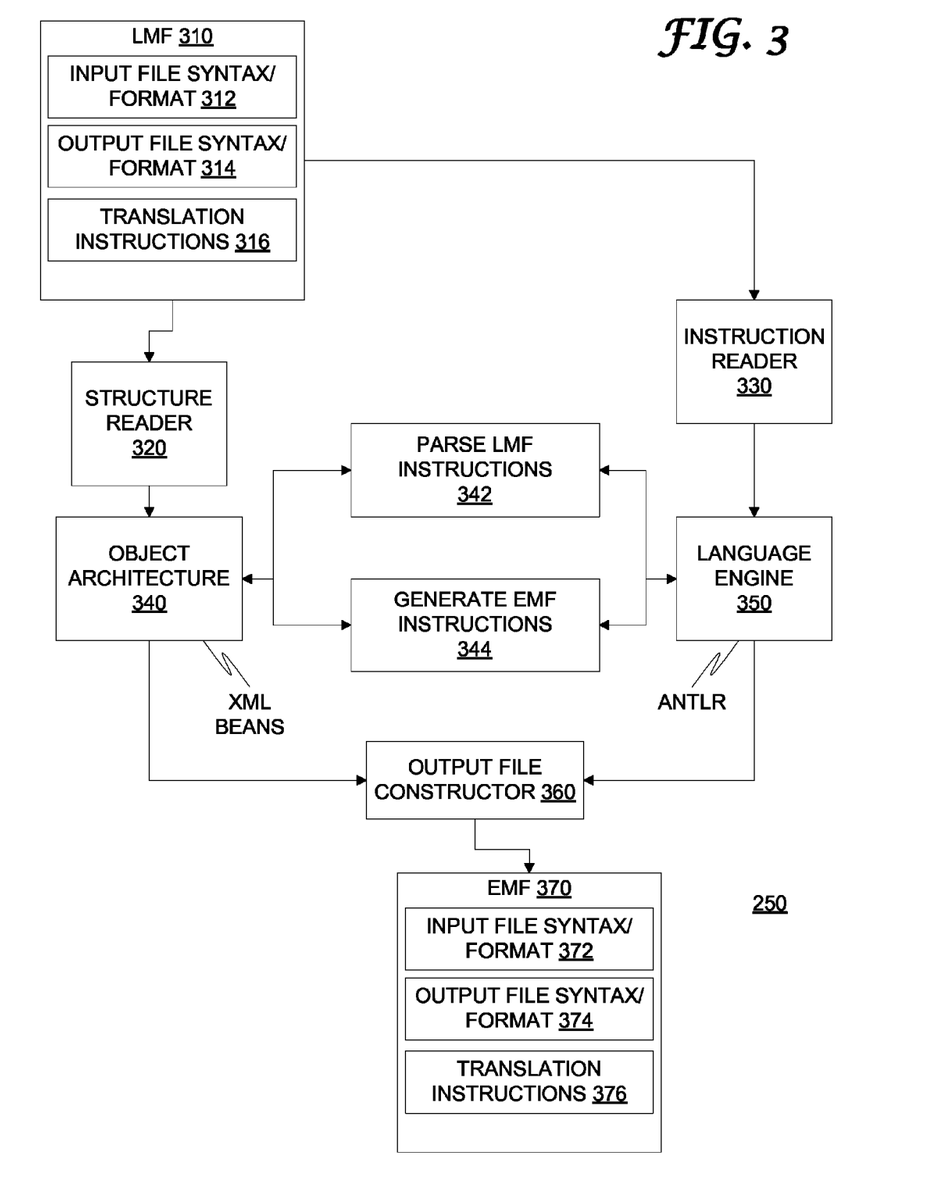
FIG. 3 is a block diagram of selected elements of an embodiment of a map migration application and objects that the application processes.

FIG. 3 is a block diagram depicting selected elements of an embodiment of TMMA 250. In the depicted embodiment, TMMA 250 includes a structure reader 320 and instruction reader 330 that process LMF 310. LMF 310 as depicted includes a description 312 of the format/syntax of the input file, a description 314 of the format/syntax of the output file, and run-time translation instructions 316 for converting an input file to an output file. Structure reader 320 may read LMF 310 and generate LMF structure information indicative of a structure of the format/syntax of file descriptions contained in LMF 310 to object architecture 340. Instruction reader 330 and language engine 350 may be configured to interpret LMF instructions stored in LMF 310 and other logical structures such as conditional logic, branching, and comparisons. Language engine 350 may interact with an object architecture 340 to parse LMF instructions as depicted in block 342 and generate EMF instructions as depicted in block 344. The resulting structures and instructions are provided to an output file constructor 360, which generates an EMF 370. Like LMF 310, EMF 370 includes a description 372 of syntax/format for an input file, a description 374 of syntax/format for an output file, and translation instructions 376 for converting an input file to an output file.

Object architecture 340 may be implemented using an XML binding framework such as XMLBeans. In this embodiment, object architecture 340 is capable of manipulating the relevant structures as software objects.

Figure 4:
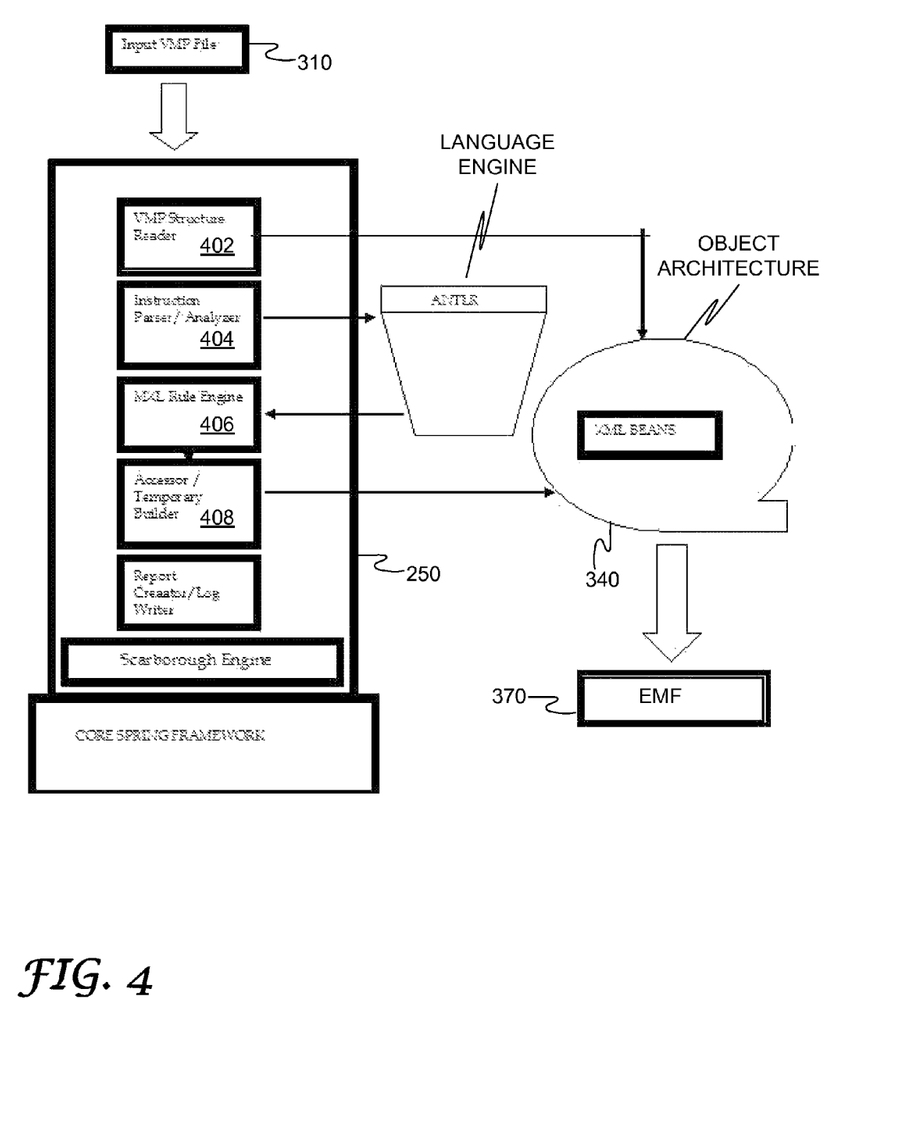
FIG. 4 is a second block diagram of selected elements of an embodiment of a map migration application.

FIG. 4, which depicts selected components of TMMA 250, emphasizes TMMA 250 providing object architecture 340 with structure data indicative of structure information in the VMP file, which is the LMF 310, i.e., data indicative of the input file format/syntax structure and/or the output file format/syntax defined in the VMP file as well as translation instructions parsed and interpreted by the instruction parser and a rule engine. TMMA 250 as depicted in FIG. 4 includes a structure reader module 402, an instruction parser/analyzer 404, an MXL rule engine 406, and an accessor temporary builder 408, all of which will be referred to in the context of the method 500 described below.

Some implementations of the TMMA are embodied as computer executable instructions stored on a computer readable medium. The computer readable medium could be the storage 230 and/or memory 280 depicted in FIG. 2 or another form of computer readable medium such as a DVD, CD, thumb drive, floppy disk, or other form of portable medium. In these embodiments, functionality of the software may be represented in flow diagram format illustrating a process that is performed when a server, desktop, laptop, or other form of computer executes the instructions.

Figure 5:
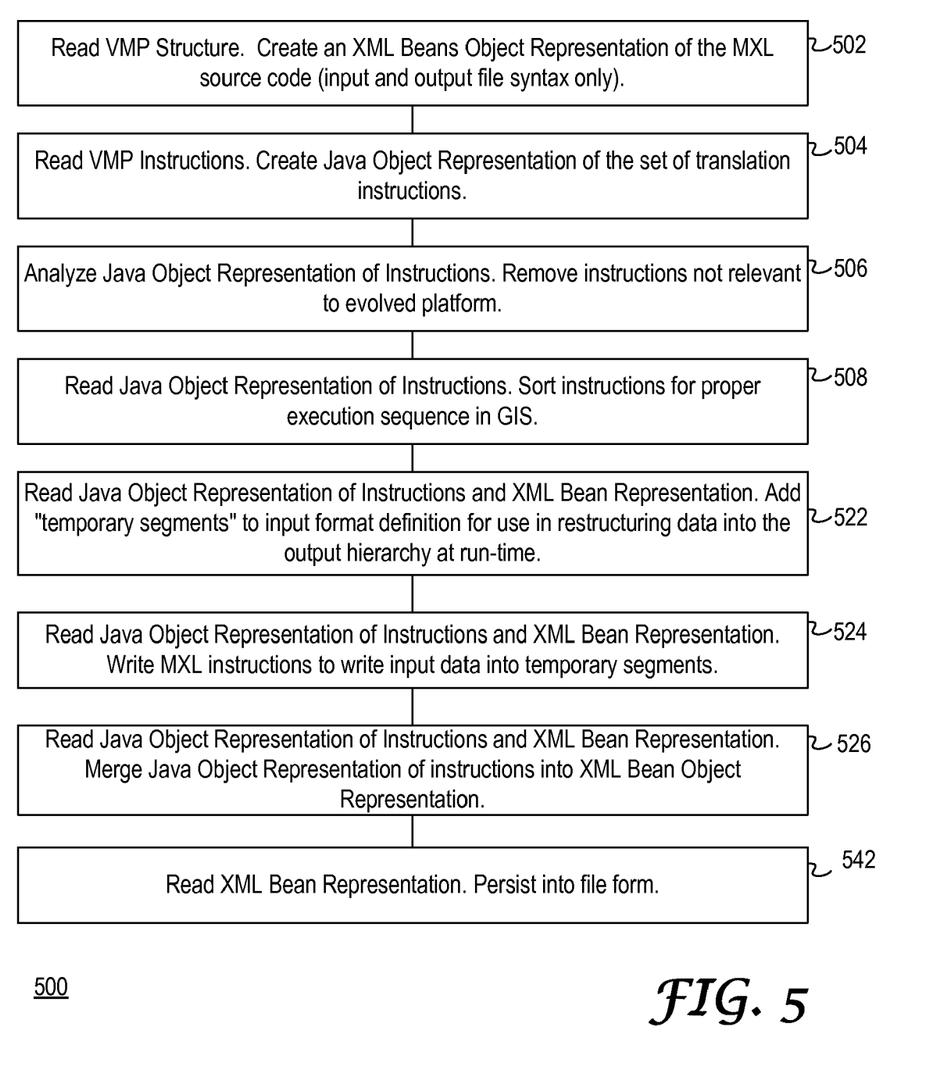
FIG. 5 is a flow diagram of selected elements of an embodiment of an exemplary map migration method.

Turning now to FIG. 5, selected elements of an embodiment of a method 500 for converting a B2B translation map are depicted. The depicted embodiment may represent a method performed by TMMA server 200 (FIG. 2) when executing TMMA 250 to generate EMF 370 from LMF 310.

The embodiment of method 500 depicted in FIG. 5 includes TMMA 250 reading the structure of the input and output file format/syntax in LMF file 310, e.g., a GSU VMP file, and creating (block 502) an object architecture representation of the source code for the input and output file format/syntax structure of EMF 370. In the depicted embodiment, XMLBeans is used as the object architecture and EMF 370 complies with an XML format such that block 502 includes creating XMLBeans Object representations of XML source code for the input and output format/syntax for EMF 370. Block 502 may be performed by VMP structure reader module 402 of TMMA 250 as depicted in FIG. 4.

Method 500 as depicted further includes TMMA 250 reading run-time translation instructions and creating (block 504) object architecture representations of the run-time instructions in EMF 370. For implementations in which XMLBeans is the object architecture and EMF 370 is an XML file, block 504 includes TMMA 250 creating Java® Object representations of run-time instructions in EMF 370. In some embodiments, block 504 is performed by instruction parser/analyzer module 404 of TMMA 250 using an ANTLR language engine as depicted in FIG. 4.

Method 500 as depicted in FIG. 5 further includes TMMA 250 analyzing the Java® Object representations of the run-time instructions generated in block 504 and filtering or otherwise removing (block 506) translation instructions that are not relevant in the evolved platform such as the GIS platform. In the context of GSU-to-GIS translation map conversion, some translation instructions necessary for GSU maps are not needed for GIS maps. For example, whereas GSU maps may require an explicit instruction that checks for data in the input before moving it to the output, GIS intrinsically detects the presence of data before executing the move to the output. The GSU maps may include a translation instruction of a form represented by the following pseudo code:

```
IF exists (elementValue) THEN map elementValue to output.
In contrast, a GIS map might include a translation instruction of a
form represented by the following pseudo code:
Map elementValue to output.
```

The analysis and filtering of block 506 may be performed by instruction parser/analyzer 404 of TMMA 250 as depicted in FIG. 4. Thus, in the described embodiment, block 506 generates a Java® Object representation of only those translation instructions that are relevant in the evolved platform, e.g., translation instructions that are relevant to GIS.

Method 500 as depicted in FIG. 5 further includes TMMA 250 reading the Java® Object representation of instructions generated at block 506 and sorting (block 508) the instructions for proper execution sequence in the evolved platform. For embodiments in which the evolved platform is GIS, block 508 may include sorting the Java® Object representations of the instructions for proper GIS execution sequence. The instruction sorting of block 508 may be performed by an MXL Rule Engine 406 depicted in FIG. 4.

For embodiments in which a GSU translation map is migrated to a GIS translation map, the GSU migration map may order its instructions randomly in the source code file because each translation instruction contains a sequence number. In contrast, GIS requires that the order of execution be the same as the order of the source code. Thus, for example, a GSU code sequence such as:

```
If exists(elementValueC) then map elementValueC to outputJ, 3
If exists(elementValueE) then map elementValueE to outputL, 5
If exists(elementValueA) then map elementValueA to outputH, 1
If exists(elementValueD) then map elementValueD to outputK, 4
If exists(elementValueB) then map elementValueB to outputI, 2
``` might be replaced by the following code sequence executing on GIS or another evolved platform:

```
map elementValueA to outputH
map elementValueB to outputI
map elementValueC to outputJ
map elementValueD to outputK
map elementValueE to outputL
```

The embodiment of method 500 depicted in FIG. 5 still further includes TMMA 250 reading the relevant and sorted Java® Object representation of instructions generated by block 508 and the XMLBeans Object representations of XML source code for the input and output format/syntax generated by block 502 and adding (block 522) "temporary segments" to the definition of the input format. The temporary segments are added to facilitate restructuring of data into the output hierarchy at run-time. The addition of temporary segments in block 522 may be performed by the Accessor/Temporary builder module 408 depicted in FIG. 4. Thus, block 522 produces an Object Architecture representation of the source code for the input and output file format/syntax structure for EMF 370 that includes the temporary segments.

The depicted embodiment of method 500 further includes TMMA 250 reading the relevant/sorted Java® Object representation of translation instructions generated in block 508 and the Object Architecture representation of the source code for the input and output file format/syntax structure for EMF 370 that includes the temporary segments generated in block 522 and generating (block 524) MXL instructions to write input data into the temporary segments. Block 524 thus generates Java® Object Representation of the relevant and sorted instructions, with accessors, for manipulating input EDI into output EDI and an XMLBeans Object Representation of input & output file format/syntax that includes temporary input structures. Block 524 may be performed by Accessor/Temporary builder module 408 depicted in FIG. 4.

Method 500 as depicted in FIG. 5 further includes TMMA 250 reading the Java® Object Representation of translation instructions and XML Bean Representation and merging (block 526) Java® Object Representation of instructions into XML Bean Object Representation to generate XMLBeans Object Representation of input & output file format/syntax that includes mapping instructions and temporary input structures. Block 526 may be performed by XML Rule Engine module 406 depicted in FIG. 4.

Method 500 as depicted in FIG. 5 still further includes TMMA 250 reading the XMLBeans Object Representation generated in block 526 and persisting (block 542) the representation as an XML compliant translation map source code file.

To the maximum extent allowed by law, the scope of the present disclosure is to be determined by the broadest permissible interpretation, and shall not be restricted or limited to the specific embodiments described in the foregoing detailed description.

What is claimed is:

1. A method for migrating a legacy translation map suitable for a legacy application to an evolved translation map suitable for an evolved application, comprising:
   determining an input file structure from input file structure information in the legacy translation map;
   determining an output file structure from output file structure information in the legacy translation map;
   creating an extensible markup language (XML) binding object representation of:
   source code for the input file structure; and
   source code for the output file structure;

creating an evolved language object representation of translation instructions in the legacy translation map;

adding temporary segments to the XML binding object representation of source code for the input file structure;

generating evolved language object representation of instructions to write input data into the temporary segments;

merging the evolved language object representation of translation instructions into the XML binding object representation; and generating the evolved translation map as an XML file based on the XML binding object representation resulting from said merging.

2. The method of claim 1, wherein the evolved language object representation comprises a Java® object representation and the XML binding object representation comprises an XMLBeans object representation.

3. The method of claim 1, further comprising, prior to said adding, removing from the Java® object representation of translation instructions, instructions not relevant to the evolved platform.

4. The method of claim 1, further comprising, prior to said adding, sorting said Java® object representation of said instructions for proper execution sequence in the evolved platform.

5. The method of claim 1, wherein creating the evolved language object representation of translation instructions includes reading translation instructions in the legacy translation map using an Another Tool for Language Recognition (ANTLR) compliant language engine.

6. The method of claim 1, wherein at least one of the input file structure and the output file structure is compliant with an electronic data interchange (EDI) standard.

7. The computer readable medium of claim 6, further comprising invoking the evolved translation map to convert the input file into an EDI compliant electronic document.

8. A map translation server comprising a processor, computer readable storage accessible to the processor method and instructions for migrating a legacy translation map suitable for a legacy application to an evolved translation map suitable for an evolved application, the instructions comprising instructions for:

determining an input file structure from input file structure information in the legacy translation map;

determining an output file structure from output file structure information in the legacy translation map;

creating an extensible markup language (XML) binding object representation of:

source code for the input file structure; and source code for the output file structure;

creating an evolved language object representation of translation instructions in the legacy translation map;

adding temporary segments to the XML binding object representation of source code for the input file structure;

generating evolved language object representation of instructions to write input data into the temporary segments;

merging the evolved language object representation of translation instructions into the XML binding object representation; and generating the evolved translation map as an XML file based on the XML binding object representation resulting from said merging.

9. The server of claim 8, wherein the evolved language object representation comprises a Java® object representation and the XML binding object representation comprises an XMLBeans object representation.

10. The server of claim 8, further comprising, prior to said adding, removing from the Java® object representation of translation instructions, instructions not relevant to the evolved platform.

11. The server of claim 8, further comprising, prior to said adding, sorting said Java® object representation of said instructions for proper execution sequence in the evolved platform.

12. The server of claim 8, wherein creating the evolved language object representation of translation instructions includes reading translation instructions in the legacy translation map using an Another Tool for Language Recognition (ANTLR) compliant language engine.

13. The server of claim 8, wherein at least one of the input file structure and the output file structure is compliant with an electronic data interchange (EDI) standard.

14. The computer readable medium of claim 13, further comprising invoking the evolved translation map to convert the input file into an EDI compliant electronic document.

15. A computer readable medium including instructions, embedded in the computer readable medium, for migrating a legacy translation map suitable for a legacy application to an evolved translation map suitable for an evolved application, comprising:

determining an input file structure from input file structure information in the legacy translation map;

determining an output file structure from output file structure information in the legacy translation map;

creating an extensible markup language (XML) binding object representation of:

source code for the input file structure; and source code for the output file structure;

creating an evolved language object representation of translation instructions in the legacy translation map;

adding temporary segments to the XML binding object representation of source code for the input file structure;

generating evolved language object representation of instructions to write input data into the temporary segments;

merging the evolved language object representation of translation instructions into the XML binding object representation; and generating the evolved translation map as an XML file based on the XML binding object representation resulting from said merging.

16. The computer readable medium of claim 15, wherein the evolved language object representation comprises a Java® object representation and the XML binding object representation comprises an XMLBeans object representation.

17. The computer readable medium of claim 15, further comprising, prior to said adding, removing from the Java® object representation of translation instructions, instructions not relevant to the evolved platform.

18. The computer readable medium of claim 15, further comprising, prior to said adding, sorting said Java® object representation of said instructions for proper execution sequence in the evolved platform.

19. The computer readable medium of claim 15, wherein creating the evolved language object representation of translation instructions includes reading translation instructions in the legacy translation map using an Another Tool for Language Recognition (ANTLR) compliant language engine.

20. The computer readable medium of claim 15, wherein at least one of the input file structure and the output file structure is compliant with an electronic data interchange (EDI) standard.

* * * * *